Figure 1:
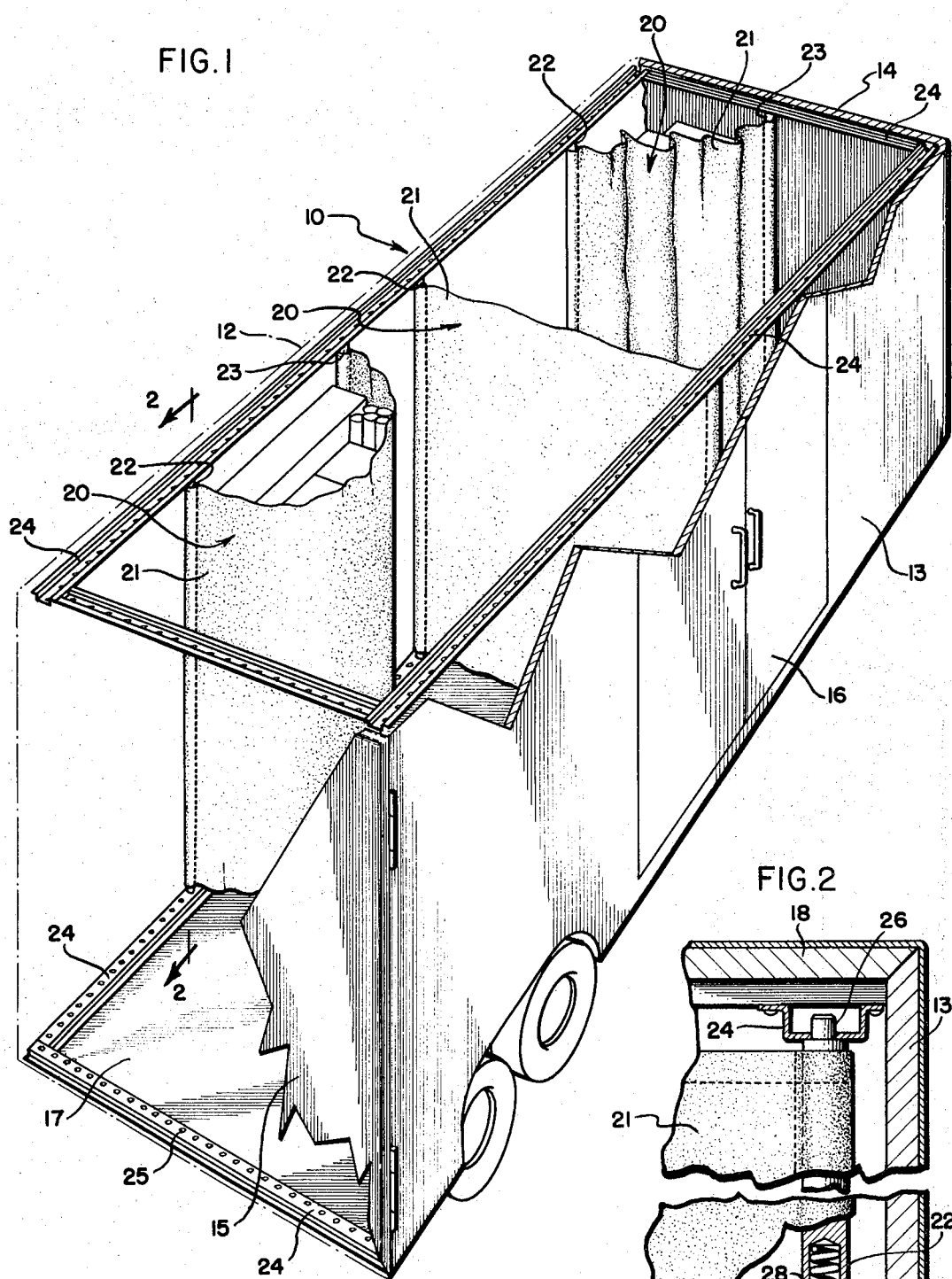

United States Patent [19]

Kluetsch

[11] 3,767,253

[45] Oct. 23, 1973

[54] ADJUSTABLE CARGO WALL

[75] Inventor: George J. Kluetsch, Oakbrook, Ill.

[73] Assignee: Illinois Mobile Leasing Corporation, Chicago, Ill.

[22] Filed: Apr. 28, 1972

[21] Appl. No.: 248,662

[52] U.S. Cl......... 296/24 R, 280/179 B, 105/369 B, 105/376
[51] Int. Cl............................................. B60p 7/00
[58] Field of Search ........................ 296/24 R, 20; 280/179 R, 179 A, 179 B; 105/369 A, 369 B, 376

[56] References Cited
UNITED STATES PATENTS

| | | | |
|---|---|---|---|
| 1,170,688 | 2/1916 | Sheet | 296/20 |
| 2,608,420 | 8/1952 | Eck | 280/179 B |
| 2,565,997 | 8/1951 | Stone | 296/24 R |

Primary Examiner—Philip Goodman
Assistant Examiner—John A. Carroll
Attorney—Jack E. Dominik et al.

[57] ABSTRACT

The invention comprises an adjustable wall which in its simplest form includes a flexible curtain wall which is secured to and extends between a pair of poles which are adapted to be positionally secured at various locations within a vehicle, between for example, the roof and the floor thereof, to define a cargo space in which cargo can be segregated. The pair of poles preferably are spring loaded and, preferably, a vehicle has at least two pair of tracks secured to the roof and the floor of the vehicle, for receiving the respective ends of the spring loaded poles, for securing the flexible curtain wall in position.

9 Claims, 2 Drawing Figures

ADJUSTABLE CARGO WALL

This invention relates, in general, to improved apparatus for cargo handling and, in particular, to improved means for segregating cargo in trucks, trailer trucks, boxcars and the like. More particularly still, it relates to an improved adjustable wall for use in vehicles used to transport cargo, for segregating the cargo.

The adjustable wall of the invention is particularly applicable for use when deliveries and pickups are to be made at a number of different locations, but it will be apparent from the description below that its use is not limited to such applications. Normally, in such cases, the last delivery to be made is the first loaded onto the vehicle, and the first delivery is the last loaded. The intermediate deliveries are correspondingly loaded so that they can be removed, in the proper order.

In the majority of cases, the deliveries are merely loaded on the truck in this fashion, with no provisions or means being used to segregate the various cargo which is to be delivered to each location. Normally, after several deliveries, the cargo is so intermingled that considerable time is lost in again separating the cargo to make sure that all cargo which is to be delivered to a particular location is, in fact, delivered.

The adjustable wall of the present invention can be used to divide a vehicle into predefined cargo spaces into which cargo for various locations can be segregated. These cargo spaces can be defined between an end wall of the vehicle, or between two of the adjustable walls positioned across the width of the vehicle. The adjustable walls also can be effectively wrapped around or about small loads against, for example, one side wall of the vehicle, to segregate and contain small loads. For storage, the adjustable walls can be positionally secured along one side wall, for example, so as not to interfere with loading or unloading of the vehicle.

Accordingly, it is an object of the present invention to provide improved apparatus for cargo handling.

More particularly, it is an object to provide an improved adjustable wall for use in vehicles used for transporting cargo, such as, for example, trucks, trailer trucks, boxcars and the like, for segregating and/or containing the cargo therein.

Still another object is to provide an improved adjustable wall which can be provided as original equipment for use in such vehicles or, alternatively, which can be easily and quickly installed therein. In this respect, a still further object is to provide an improved adjustable wall which can be inexpensively manufactured and installed.

Other objects of the invention will in part be obvious and will in part appear hereinafter.

The above objectives are accomplished with an adjustable wall which in its simplest form includes a flexible curtain wall which is secured to and extends between a pair of poles which are adapted to be positionally secured at various locations within a vehicle, between for example, the roof and the floor thereof, to define a cargo space in which cargo can be segregated. The pair of poles preferably are spring loaded and, preferably, a vehicle has at least two pair of tracks secured to the roof and the floor of the vehicle, for receiving the respective ends of the spring loaded poles, for securing the flexible curtain wall in position.

The invention accordingly comprises the features of construction, combination of elements, and arrangement of parts which will be exemplified in the construction hereinafter set forth, and the scope of the invention will be indicated in the claims.

Figure 2:
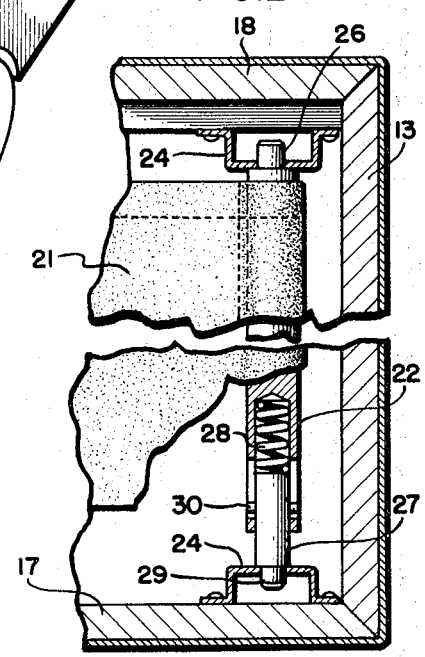

For a fuller understanding of the nature and objects of the invention, reference should be had to the following detailed description taken in connection with the accompanying drawings in which:

FIG. 1 is a perspective view, partially sectionalized, of a vehicle illustrating the manner in which the adjustable walls are positionally secured therein to segregate cargo; and FIG. 2 is a sectional view generally illustrating the manner in which the tracks are secured within the vehicle, for receiving the respective ends of the spring loaded poles of the adjustable wall.

Similar reference characters refer to similar parts throughout the several views of the drawings.

Referring now to the drawings, in FIG. 1 there is illustrated a vehicle for transporting cargo, which vehicle in the illustrated example is a trailer truck. The trailer truck can be of a conventional construction having side walls 12 and 13, and end wall 14 and doors 15 on the end opposite the end wall 14, together with floor 17 and a roof 18. Side doors 16 also can be provided.

The vehicle 10 can be provided with a number (3 illustrated) of adjustable walls 20 for segregating or separating cargo to be loaded therein. These adjustable walls 20 each include a flexible curtain wall 21, which can be of, for example, a nylon or canvas material, and two of the opposite edges thereof are fixed to a pair of poles 22 and 23. These poles 22 and 23, in the illustrated example, are of a length sufficient to permit them to be secured between the floor 17 and the roof 18 of the vehicle 10. The flexible curtain wall 21 preferably, but not necessarily, spans substantially between the floor 17 and the roof 18 and, furthermore, preferably is of a length to span across the width of the vehicle 10, between its side walls 12 and 13.

The poles 22 and 23 preferably are of a construction to permit them to be forcibly biased in an upright position, between the floor 17 and the roof 18, as illustrated. In this respect, the poles 22 and 23 can have at least one end thereof spring loaded, as illustrated in FIG. 2. It can there be seen that the poles 22 and 23 each have a telescoping portion 27 which is biased outwardly by means of a bias spring 28 to secure the pole in an upright position. A pin 30 or the like can be secured to the telescoping portion 27, and slidably engaged within a pair of slots 31 in the poles, to prevent the telescoping portion 27 from being ejected therefrom.

To secure the poles 22 and 23 in position within the vehicle 10, tracks 24 preferably are secured, in pairs, to the floor 17 and the roof 18 of the vehicle, adjacent at least the side walls 12 and 13 thereof. Such tracks can additionally be secured to the floor 17 and the roof 18 adjacent the end wall 14 and the doors 15, if desired. These tracks 24, as can be best seen in FIG. 2, are generally U-shaped and have a number of spaced apart holes 25 formed therein. The poles 22 and 23 have a reduced diameter portion 26 formed on one end thereof, and on the telescoping portion 27 thereof, which are correspondingly proportioned to be received within these holes 25 in the tracks 24. While it is preferred to provide tracks 24 within the vehicle 10, obviously various different pole positioning and support means can be provided or, alternatively, holes or the like for receiving the ends of the poles can be provided directly in the floor and the roof of the vehicle.

In positioning the adjustable walls within a vehicle 10, as can be seen in FIG. 1, one of the poles 22 can be secured within the tracks 24 adjacent the side wall 12 of the vehicle, with the flexible curtain wall 21 stretched across the width of the vehicle with the other pole 23 secured within the tracks provided adjacent the opposite side wall 13. When stretched across the width of the vehicle 10 in this fashion, the adjustable wall 20 divides the vehicle 10 into two cargo spaces in which cargo can be separated or segregated. Additional adjustable walls 20 can be secured across the width of the vehicle 10 in the same fashion, to define therebetween any number of cargo spaces in which cargo can be similarly segregated or separated. A small load of cargo also can be confined against one side wall of the vehicle by affixing both of the poles 22 and 23 within the tracks adjacent the one side wall 12 or 13, with the flexible curtain 21 wrapped around or about the cargo. Further still, if tracks 24 are provided adjacent the end wall 14, for example, one of the poles 22 can be secured within the tracks adjacent the side wall 12 and the other pole can be secured within the tracks adjacent the end wall 14, so that the flexible curtain wall 21 spans diagonally across the corner of the vehicle 10, to thereby define a cargo space in which cargo can be contained.

In storing unused adjustable walls 20, the poles 22 and 23 thereof can be secured within the tracks adjacent one wall of the vehicle, so that the adjustable walls do not interfere with the loading or unloading of the vehicle 10. While it is preferred that the poles of the adjustable walls span between the floor and the roof of the vehicle, it is apparent that the tracks could be secured to the side walls adjacent the roof and the floor so that the poles extend horizontally rather than vertically. In such cases, of course, the flexible curtain wall 21 would hang from the upper pole and be secured by the lower pole.

It will thus be seen that the objects set forth above, among those made apparent from the preceding description, are efficiently attained and certain changes may be made in the above construction. Accordingly, it is intended that all matter contained in the above description or shown in the accompanying drawing shall be interpreted as illustrative and not in a limiting sense.

Now that the invention has been described, what is claimed as new and desired to be secured by Letters Patent is:

1. An adjustable cargo wall for use in combination with vehicles such as trucks, trailer trucks and boxcars having pairs of spaced opposing walls for segregating cargo and the like therein comprising: a pair of poles each of a telescopic construction to be forcibly resiliently biased in position to extend between said pair of opposing walls of said vehicle, a flexible curtain wall secured to and extending between said pair of poles, whereby said pair of poles can be positionally secured between said pair of opposing walls of said vehicle such that said flexible curtain wall defines a cargo space in which cargo can be segregated.

2. The adjustable cargo wall of claim 1, wherein said poles have at least one portion thereof which are spring biased outwardly to engage said walls to forcibly bias and positionally secure said pair of poles between said opposing walls.

3. The adjustable cargo wall of claim 2, wherein said pair of poles are positionally secured between the opposing walls forming the ceiling and the floor of said vehicle adjacent another wall forming a side wall of said vehicle such that said flexible curtain wall defines between it and said side wall a cargo space in which cargo can be segregated.

4. The adjustable cargo wall of claim 2, wherein each of said pair of poles is positionally secured between the opposing walls forming the ceiling and the floor of said vehicle and adjacent one of the other walls thereof forming a side wall of said vehicle such that said flexible curtain wall extends across the width of said vehicle from one side wall to the other to thereby define a cargo space in which cargo can be segregated.

5. The adjustable cargo wall of claim 2, wherein said flexible curtain wall is of a nylon material.

6. The adjustable cargo wall of claim 2, wherein said flexible curtain wall is of a canvas material.

7. The adjustable cargo wall of claim 2, further including a first pair of tracks affixed respectively to two opposing walls of said vehicle and a second pair of tracks affixed respectively to the same two opposing walls in spaced relationship to said first pair of tracks, said first and second pair of tracks including means for receiving the opposite ends of said poles for positioning said poles and said flexible curtain within said vehicle.

8. The adjustable cargo wall of claim 7, wherein said first and second pair of tracks are affixed to the two opposing walls forming the ceiling and floor of said vehicle.

9. The adjustable cargo wall of claim 7, wherein said means for receiving the ends of said poles comprise a plurality of spaced-apart holes in said tracks formed to receive the end of said poles.

* * * * *